United States Patent [19]
Schoonmaker et al.

[11] 3,855,912
[45] Dec. 24, 1974

[54] SANDWICH MAKING APPARATUS

[75] Inventors: Charles Donald Schoonmaker, Boonton Twsp.; Carl G. Hebel, Haworth; Robert Francis Bardsley, Harrington Park, all of N.J.

[73] Assignee: General Foods Corporation, White Plains, N.Y.

[22] Filed: Dec. 12, 1972

[21] Appl. No.: 314,293

[52] U.S. Cl. ............ 99/450.4, 99/467, 99/517, 99/537
[51] Int. Cl. ............ A21c 9/04, B26d 4/00
[58] Field of Search ............ 99/450.4, 450.5, 450.6, 99/450.7, 467, 468, 517, 450.1, 537

[56] References Cited
UNITED STATES PATENTS
1,211,375  1/1917  Clayton ............ 99/450.4
2,626,575  1/1953  Whitsel ............ 99/450.4

*Primary Examiner*—Harvey C. Hornsby
*Assistant Examiner*—Alan Cantor

[57] ABSTRACT

An assembling system for sandwich-making by slicing a tempered filling bar in a controlled, low-temperature, low-humidity atmosphere intermediate bread slice manipulations provides a consistent and non-contaminating sandwich assembly operation for frozen sandwiches.

6 Claims, 7 Drawing Figures

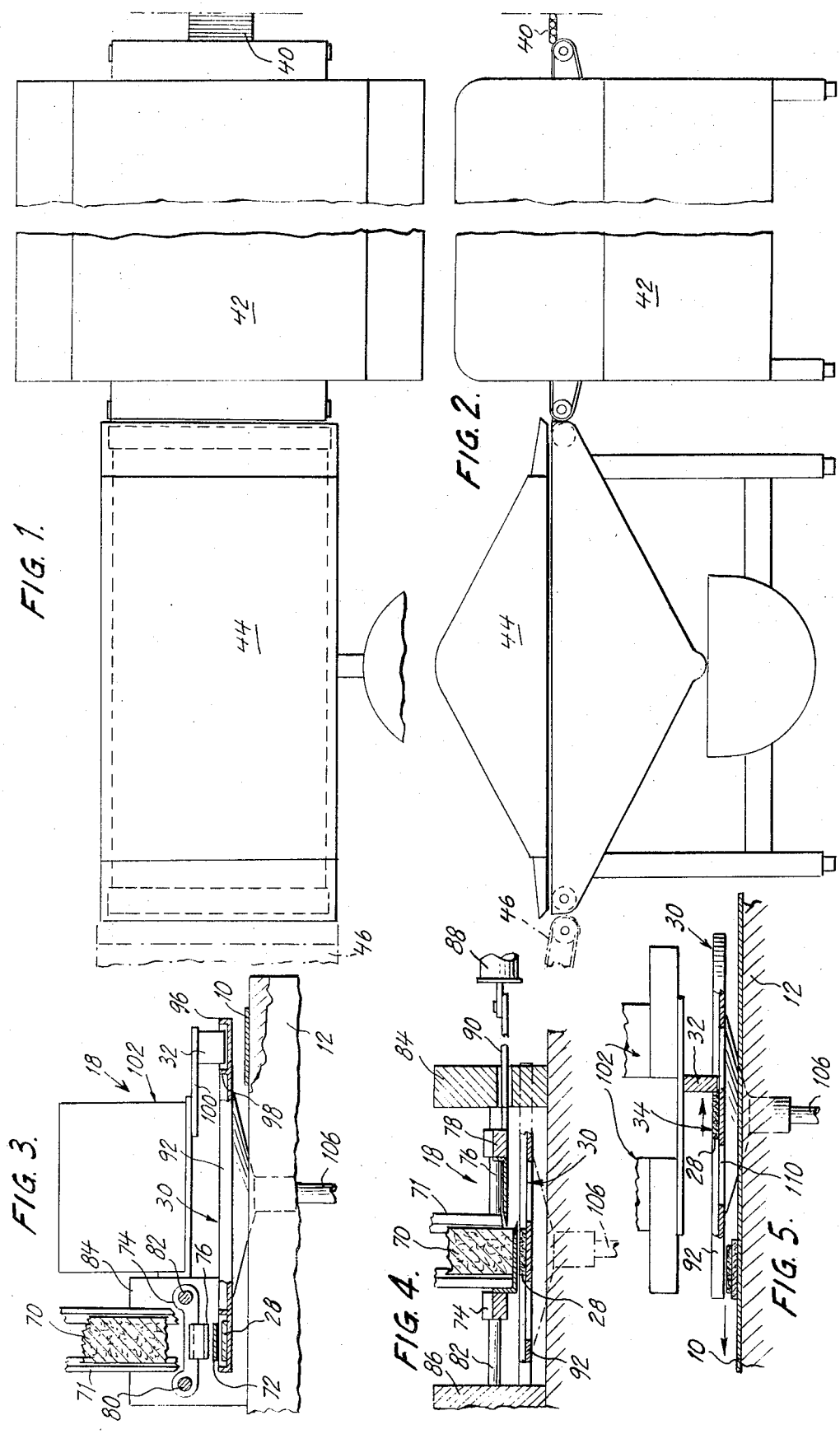

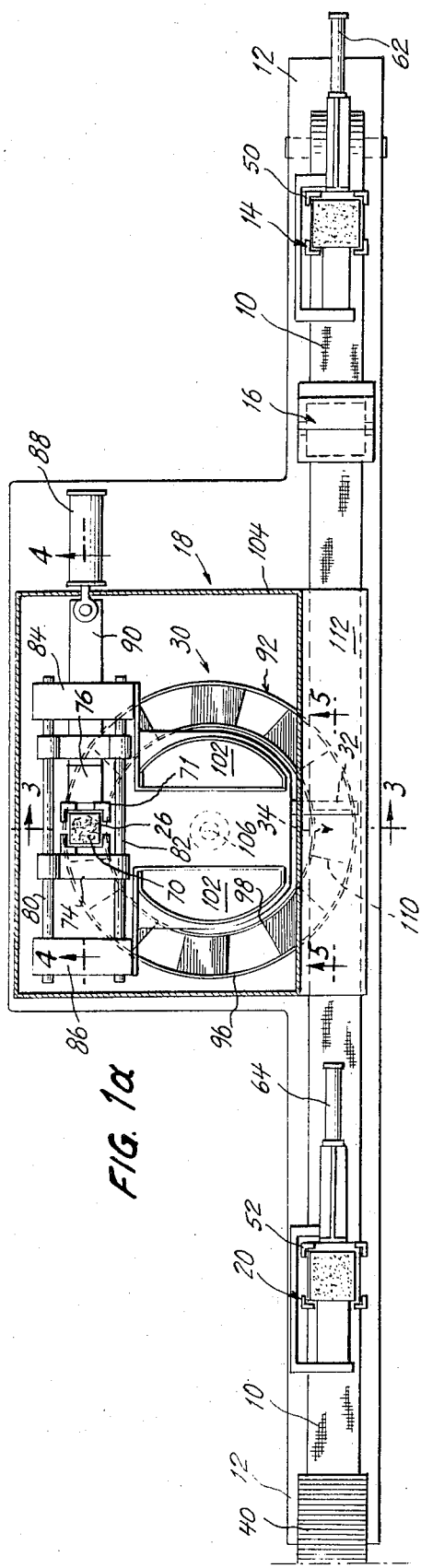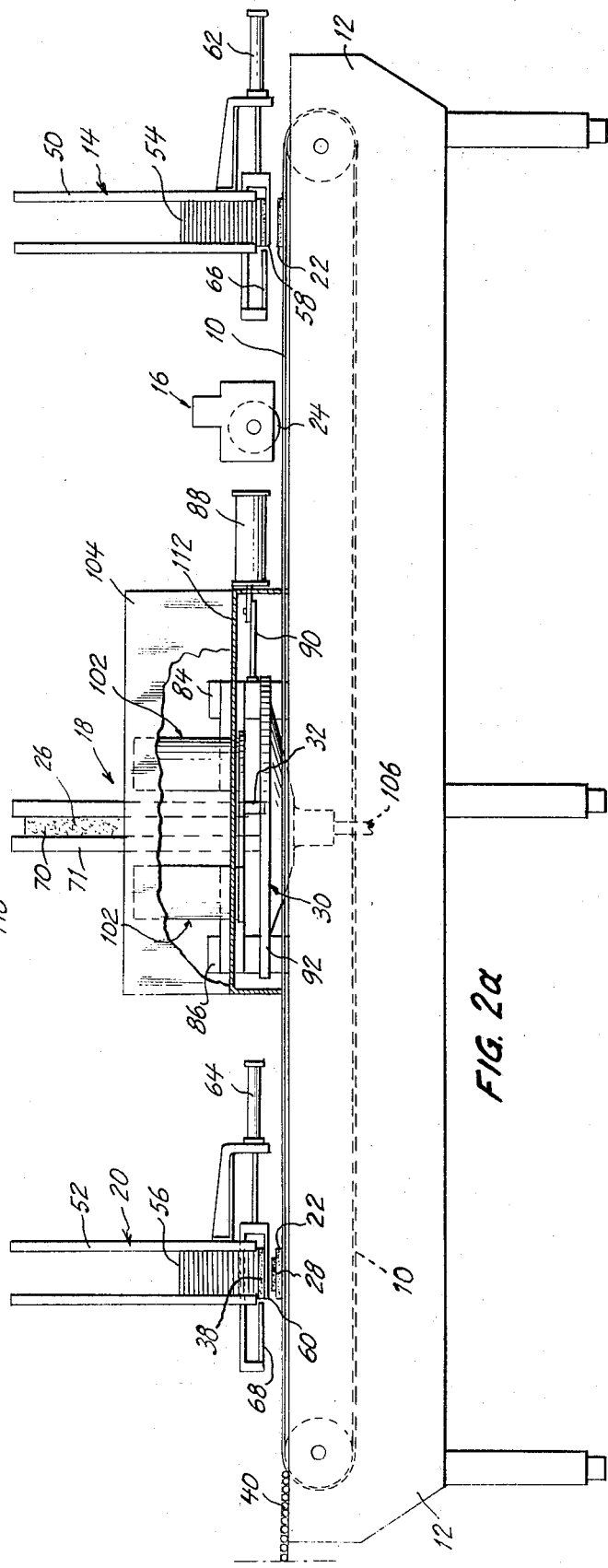

SANDWICH MAKING APPARATUS

INTRODUCTION

This invention relates to unique means for assembling sandwiches consisting of slices of bread with a filling deposited therebetween and more particularly relates to a method whereby the filling per se is faithfully sliced and deposited on bread slices preparatory to completion of the sandwich making process.

Related application, U.S. Ser. No. 155,964, filed June 23, 1971 by Dr. F. Kleiner et al, and commonly assigned herewith for Process for Sealing Two or More Pieces of Foodstuff, describes dielectric heater for effecting sandwich making of use in this invention for completion on the sandwich assembly system to be described.

BACKGROUND OF THE INVENTION

Heretofore sandwich assembly by mechanical means has utilized bread slices whereon are deposited fillings and whereafter the filling is covered by a second slice preparatory to freezing or other sandwich preservation step. The art of sandwich making actually has not progressed to the point where a truly successful composite of bread slices and filling that is reliable and affordable may be provided. Related arts have been of some use in this direction but with only limited success.

To illustrate, in the cheese slicing art, cheese bars have been assembled for slicing and depositing in wrapping means. In such applications the cheese is customarily processed at ambient temperatures or below but not at temperatures as low as 32°F. or below. When employing such slicing and depositing apparatus, the comestible be it the form of a filling containing an oleaginous composition or otherwise, may "gum" or otherwise interrupt the slicing and depositing operations. In any sanitary plant practice it will be desirable to employ a sandwich-making assembly in a controlled, low-temperature, low-humidity environment; this is so particularly when the sandwich is to be frozen and distributed in this state. The mechanical components required for consistently slicing and depositing the filling in this environment experience problems.

If the filling is formed in the shape of a bar which is to be sliced preparatory to having the bar slice immediately thereafter transferred onto the sandwich, the bar composition may either shatter or become sticky. Low-temperature processing invites the deposit of atmospheric moisture at the perimeter of the bar and transverse slicing across the cross-section of the bar will be inconsistent; melted or frosted portions of successive bar slices eventually accumulate in a matter of minutes necessitating interruption if not termination of the sandwich-making process. Mitigation of this problem by cooling the bar to a low enough temperature whereat such slicing irregularities are not experienced will on the other hand result in shattering of the filling slice and thus similarly necessitate interrupting the sandwich-making process.

Yet, such sandwich making assembly systems desirably employ a preformed bar usually in a frozen condition since to do otherwise produces significant handling problems either in terms of the sanitation of the filling composition per se or irregularities in the manner in which the filling is deposited on the bread slice. It is among the objects of the present invention, therefore, to provide means whereby a formed filling bar to be used to supply individual bar slices intermediate bread slices can be consistently and controllably conditioned in mechanical sandwich making. These and other objects of the invention will become apparent to those skilled art workers as the specification proceeds.

STATEMENT OF THE INVENTION

In accordance with the present apparatus, assembly of a sandwich takes place by depositing on one slice of bread and in succession a filling slice under a controlled, low-temperature and de-humidified atmosphere, whereafter the slice with the filling will continue to a second slice depositing station on the partially assembled sandwich whence the slices are ultimately assembled, preferably sealed, and thence frozen. The slicing and depositing means comprise in combination:

1. Means for tempering a prismatic filling bar to a pre-determined temperature from below about 0°F to a typical range between 10°–20°F and generally above that temperature whereat the bar may be sliced without shattering but below that temperature at which the bar will soften or curl incident to slicing;

2. Means for transversely slicing across the cross-section of the bar in a direction normal to the longitudinal axis thereof at the lower extremity of the bar;

3. Means for receiving the slice thus formed and transferring it to a depositing station which means are preferably operative to move the slice transverse to the bar axis;

4. Means for accurately positioning the bar slice in a fixed station from which it may be dropped onto a bread slice;

5. Means to advance the bread slice and superposed filling slice to a succeeding operating station; and 6. Means controlling the atmospheric temperature and moisture in the zone surrounding the foregoing bar slicing, transferring and depositing means so as to prevent moisture build-up in said zone and assure that the parts thereof are substantially frost-free.

By reason of the substantially frost-free condition of the appurtenant elements contacting the filling bar and despite the fact that the bar itself and the slicing and moving elements thereof are at moisture below 32°F, the bar slice is formed uniformly with a clean cut while in a firm condition and does not generate fragments and adhere to any of the moving parts necessary to effect transfer and deposit. The foregoing system permits one to employ a wide variety of filling compositions lending a versatility to the sandwich-making operation. The defrosted condition of the slicing zone is such that the speed of the slicing and transferring and depositing means used to implement the system can be varied within a wide range depending upon the melting or freezing characteristics of the filling composition. A collateral advantage of the foregoing apparatus is that the bar slice superposing the bread slice will emerge from this controlled, defrosted zone without experiencing undesired frosting of water vapor on the slice and bread; the essentially frost-free filling slice superposing the bread slice will thus enter ambient room temperature in a condition free of any significant amount of frosting and may thus be introduced to subsequent operations in a condition which is more compatible therewith.

By preventing a build-up of frost and accumulating comestible fragments, the danger of contamination is lessened and the bar slicing and depositing operation can be continued indefinitely without necessitating interruption for sanitary cleaning or inspection other than would be dictated by good plant sanitary practice.

In achieving the aforestated conditions one simple and convenient expedient and the preferred mode of operation will be to create a hood which defines an enclosed area wherein is deposited dry ice (frozen carbon dioxide). As will be apparent from the accompanying drawings and descriptive portions of the specific preferred embodiment of the apparatus, sublimed carbon dioxide shrouds the zone surrounding the other components of the system for slicing, transferring and depositing, thus effectively purging the atmosphere of moisture. This expedient also serves to keep the mechanical elements at or below 0°F, but not sufficiently below that temperature to occasion a significant reduction in filling bar temperature. As an alternative to the foregoing means, a more complex and sophisticated system would call for means for conditioning the atmosphere surrounding the mechanical slicing, transferring and depositing means, all of which will be apparent to those skilled in the art and form no particular part of the present invention except to the extent that they implement the functions specified hereinabove.

The bread slice will preferably have been coated with an adhesive hydrocolloid preferably in the form of a liquid solution thereof operative to seal the slice to a later superposed slice for completion of the sandwich-making process. The thus adhesive-coated slice which will have the perimeter of starch colloidal adhesive in an activated state thereon will together with the superposed filling or bar slice be then introduced to successive top slice bread feeding stations, sandwich depositing straightener stations and ultimate sealing stations operative to cause adhesion and thus effect adherence of the opposed borders of the slices and produce a composite or sandwich having the filling intermediate.

DESCRIPTION OF DRAWINGS

Referring now to the accompanying drawings describing a preferred mode in accordance with the present invention, FIG. 1a is a top plan view of the sandwich-making apparatus showing the seasoning bar slicing and transferring means; FIG. 1b is a like top plan view showing subsequent operations in the sandwich making operation for sealing and margarine coating the completed sandwich composited in the device of FIG. 1a; FIG. 2a is a side elevation of the apparatus in FIG. 1a with sections broken away to reveal parts in section and parts in elevation for a better understanding of the invention; FIG. 2b is a side elevation view of the portions of the assembly shown in FIG. 1b; FIG. 3 is a vertical sectional view taken along line 3—3 in FIG. 1a showing the seasoning bar slicing and transferring disk assembly; FIG. 4 is a sectional view taken along line 4—4 in FIG. 1a at 90° to the sectional view in FIG. 3 and showing in detail the slicing or knife-engaging apparatus; and, FIG. 5 is a vertical sectional view taken along line 5—5 in FIG. 1a showing the slice transfer and depositing apparatus assembly as it deposits seasoning bar slices onto bread in an operation which will now be described.

Referring to FIG. 1a, the assembly comprises an endless belt 10 mounted on a belt drying and sanitizing housing 12 and adapted to move and underlie in seriatim bread feeder station 14, starch applicator 16, slicer and transferring assembly 18; and, top slice feeder 20.

In operation, the bread feeder 14 provides a bottom slice in the position shown at 22 which is moved into communication with starch applicator head 24 on applicator 16. The applicator is adapted to edge-coat the top surface of the bottom slice prior to its entry into assembly 18 wherein a bar of seasoning 26 is transversely sliced as will be described in greater particular with reference to FIGS. 3-5 to form a generally complementary slice 28 say of cheese whose perimeter is within the outline of and in-board of the edge of the bread bottom slice, the slice 28 being transferred from the slicing zone on a rotating disk assembly 30 and displaced therefrom by engagement with fixed bar 32 which causes transfer from the assembly onto the moving belt with the coated bread slice thereon as shown at 34 through disk opening 110.

After depositing the seasoning slice 34 onto bottom slice 22, the sandwich assembly operation is completed by depositing the top slice 38 onto the coated bread slice 22 and seasoning slice 28. Thereafter, the sandwich is transferred by suitable means such as roll assembly 40 to a dielectric heating oven shown generally at 42 and forming a part of the present invention but wherein the bread slices are sealed to one another after juxtaposition as shown in FIG. 2a and whereafter the sealed sandwich is thereafter coated with a margarine spray in coating chamber 44 which completes the sandwich-making product produced using the slicing assembly of this invention, the ultimate sandwich being delivered from chamber 44 onto a discharge transfer belt 46.

Reverting to FIGS. 1a and 2a, the bread feeders 14 and 20 each comprise: vertically mounted chamber 50, 52 wherein pre-sliced bread is loaded as at 54, 56 and wherein the lowermost slice in each magazine load thereof rests on a plate 58, 60 adapted to be withdrawn under the control of air cylinder means generally shown as 62, 64. As bottom plates 58 and 60 respectively are withdrawn separating knives 66, 68 are moved rightwardly as shown in FIG. 2a to separate positively one slice from a superposing load thereof and support this load while the slice drops onto belt 10, knives 66, 68 being integrally mounted on air cylinder assemblies 62, 64 to reciprocate for functioning as just-described.

Having just described the bread feeding mechanism, reference may be had for understanding the seasoning slicing assembly of this invention to FIGS. 3-4 as well as FIGS. 1a and 2a. A seasoning bar 70 chilled to say 10°-20°F is loaded in vertical magazine channel assembly 71 coated with teflon on the bar-engaging innerfaces thereof for sanitation. The bar 70, at its lower extremity, is adapted to rest upon supporting plate 72 mounted upon knife support-slide 74 adapted to reciprocate in integral cooperation with cutting knife 76 mounted on knife base 78 under the control of rods 80, 82 mounted in bearing blocks 84, 86 and actuated by air cylinder means 88 pivotally connected for quick-disconnect for sanitation purposes to a knife support-slide mechanism actuating-pusher bar 90. In operation, the pusher bar 90 causes knife 76 to engage transversely the lower extremity of seasoning bar 70 while simultaneously plate 72 is withdrawn until a complete seasoning slice is formed whereupon the slice is adapted to fall under gravity onto circular disk transfer table 92 designed to rotate from say the 12 o'clock position shown in FIG. 1a counter clockwise to the 6 o'clock position as at point 34, individual slice moities being confined faithfully within table 92 by annular rim 96 adapted to cooperate with eccentrically and separately rotating inner rim 98. Rim 98 is caused to narrow the radial spacing between it and rim 96 as slices are transferred within rims 96 and 98 to a deposit station as at 34 where the edge of the slice thusly formed (28) is engaged by a fixed bar 32 mounted on arm 100 depending from $CO_2$-ice chest 102.

Overlying the slicing assembly 18 is a hood, preferably of transparent plastic 104 adapted to define a refrigerant $CO_2$ gas chamber overlying the slicing and transferring and depositing zones in the assembly and provide a uniform and regulated temperature.

In operation as transfer table 30 is rotated under the control of shaft 106 as a slice 28 is first formed and dropped onto table 30 the space between outer rim 96 and inner rim 98 is wide enough to accommodate the slice and compensate for any eccentricities in its drop upon being cut. Thereafter with continued rotation of the shaft 106 the inner rim 98, being eccentrically mounted, narrows the gap between the inner and outer edge faces of the slice and progressively constrains the slice to move in a more predetermined and controlled path until approximately 180°F has been travelled by the slice on the disk transfer table 30. The actuation of shaft 106 is such that individual slices delivered to station 34 drop through slightly canted openings as at 110, whence the slice will fall under gravity faithfully onto the previously coated bread slice. The bottom bread slices are advanced in step-wire fashion and in synchronous movement to be in position to receive slice 28 passing opening 110. Thus the respective superposing seasoning bar slice 28 is timed to fall in place onto bottom slice 22 faithfully within the perimeter of the edge coating of starch.

Although it is not necessary to show it, gas generated in chest 102 by the sublimation of carbon dioxide overflows and overlies the conveyor 10 as it enters the chamber defined by walls 104 and in this way forms a dehymidifying gas shroud in the transferring and depositing chamber generally shown as 112. As the seasoning slice with the underlying bread emerges from zone 112, it is in a frost-free condition and consistently moves to the next succeeding station whereat the top slice of bread may be fed as explained hereinabove.

The overall ambient condition wherein the total assembly just described operates is customarily and preferably maintained for sanitation and good microbiological decontamination practice at a temperature below 50°F. Ambient conditions within the hood or walled portion 104 confining the carbon dioxide shroud generated by the subliming $CO_2$ will be in the neighborhood of about 0°F.

It will be seen from the foregoing specification that any thermoplastic comestible which is commonly oleaginous in character, such as cheese, may be sliced and deposited on the bread slice in the sandwich assembly system; but, in addition to such oleaginous materials, sandwich meats or meat spreads of a proteinaceous character but having like rheological characteristics may be separated from a tempered and hardened bar form at a temperature at which it is sliceable but shape retaining.

Likewise, although a dehumidified, refrigerated, gaseous zone formed by the sublimation of solid $CO_2$ is the preferred mode for controlling atmospheric temperature and moisture in the zone surrounding the bar slicing, transferring and depositing means for prevention or minimization and generally for control of humidity, other means may likewise be employed for equivalent substantially frost-free conditions in the sandwich assembly system. Thus, means for controlling the relative humidity as well as temperature such as a conventional air conditioning and refrigeration system known to those skilled in the art may be readily substituted for the identical purpose provided such means are operative to maintain the sealing bar temperature below that temperature at which it can be sliced without shattering or curling but above that temperature at which it can be cut transversely without shattering or breaking.

The best mode for practicing the invention described is a horizontal rotating transferring disk or table which has the advantage of delivering a plurality of individual and separated bar slices to the slice depositing station; a single in-line slice depositing system may be likewise employed.

The practices for the means of the aforementioned assembly will preferably be carried out in coordinated, synchronized movements such that the conveyor means, the bread slice feeders and the bar slice depositor are actuated periodically whereby the bread slice and thereafter the superposed bar slice as well as the upper bread slice are advanced in like phase and with interruptions such as is achieved by geneva movements known to skilled art workers.

Thus the objects and descriptive portion of the specification have been developed in depicting a best and preferred mode for employing the slicing and depositing apparatus of this invention. The advantages have been illustrated in the preamble to this specification and during the course of describing the methods of operation thereof. For an understanding of the true scope of the invention and spirit, reference should be had to the accompanying claims.

What is claimed is:

1. In a sandwich-making assembly system, apparatus for slicing a prismatic bar of thermoplastic comestible which comprises means for tempering a prismatic bar to a pre-determined temperature ranging from below 0°F to 20°F and above that temperature whereat the bar may be sliced without shattering but below that temperature at which the bar will soften or curl incident to slicing; means for transversely slicing said bar across its cross-section; means for receiving the slice thus formed and transferring it to a depositing station operative to move the slice transverse to the bar's axis; means for positioning the transferred bar slice to a station from which it may be dropped onto a bread slice; means to advance the bread slice and superposed sealing slice to a succeeding operating station; and, means controlling the atmospheric temperature and moisture in the zone surrounding the foregoing bar slicing, transferring and depositing means so as to maintain a low relative humidity in said zone and assure that the parts thereof are substantially frost free.

2. Apparatus according to claim 1 wherein said transfer means are operative to move the slice transverse to the bar axis upon deposit of the slice on said means.

3. Apparatus according to claim 1 wherein said zone is formed by the action of a subliming refrigerated gas therein.

4. The apparatus of claim 3 wherein said gas is carbon dioxide.

5. In a system according to claim 1, means for feeding pre-sliced bread onto conveyor means, conveyor means for receiving the individual bread slices and conveying them to the station from which the bar slice is dropped onto the bread slice, and means synchronizing said bar slicing, transferring and depositing means with operation of the bread slice feeding and conveying means.

6. In a system according to claim 5, means for applying to the edge of a bread slice an edible sealing composition prior to depositing of the bar slice on said bread slice, means for depositing a bread slice on top of the superposed bar slice and lower bread slice, and means for sealing the superposed bread slices through the intermediation of said sealing composition.

* * * * *